Jan. 24, 1950 R. R. HAYS 2,495,523
SUSTAINING ROTOR FOR AIRCRAFT
Filed Jan. 20, 1945 2 Sheets-Sheet 1
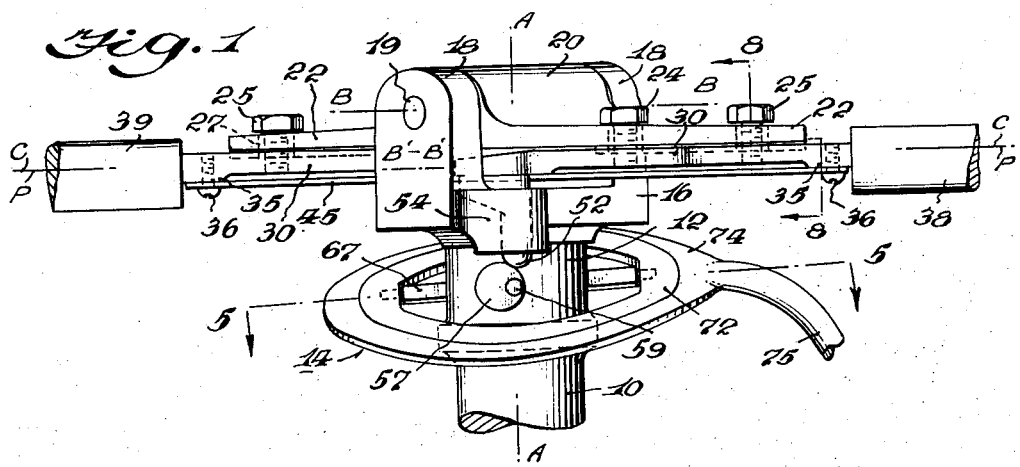
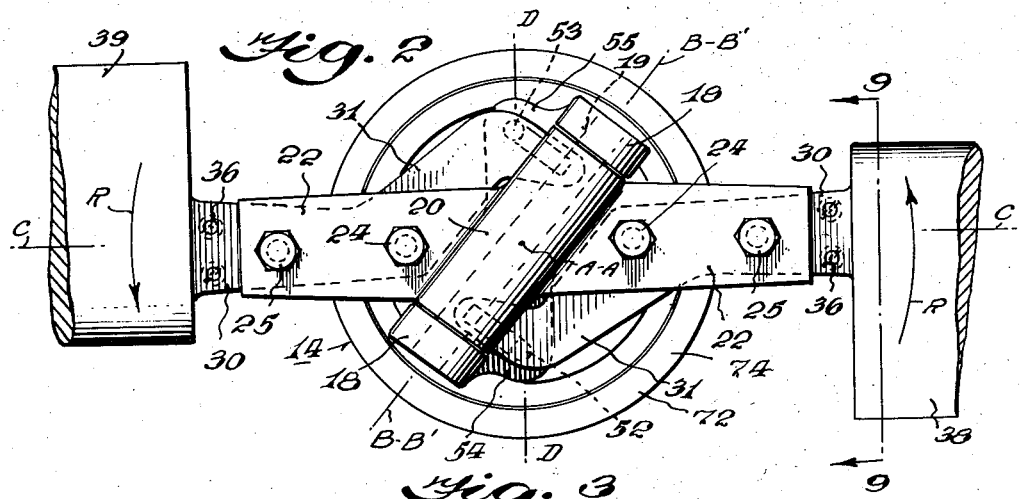
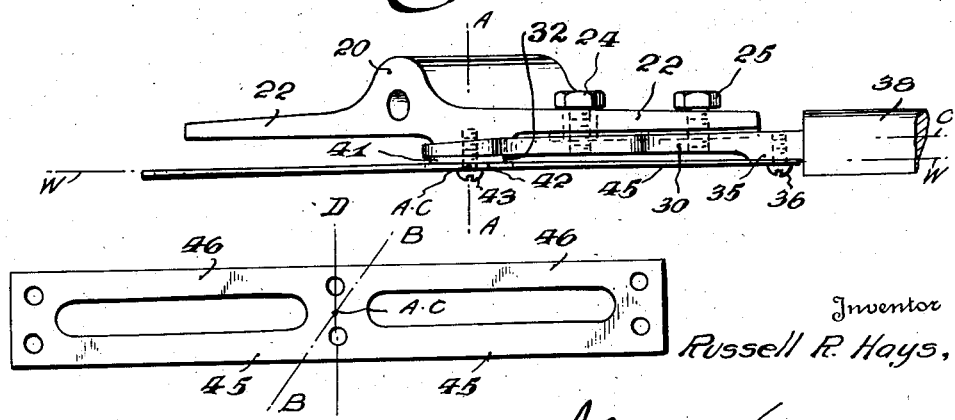
Inventor
Russell R. Hays,
By J. Harold Kilcoyne
Attorney Jan. 24, 1950 — R. R. HAYS — 2,495,523
SUSTAINING ROTOR FOR AIRCRAFT
Filed Jan. 20, 1945 — 2 Sheets-Sheet 2
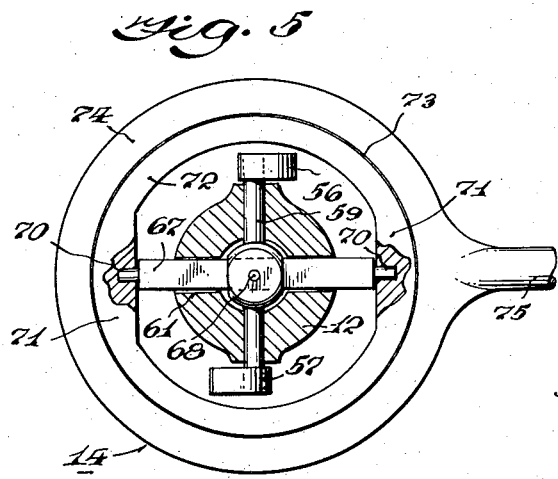
Fig. 5
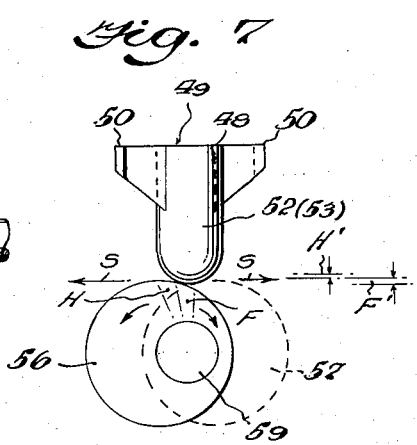
Fig. 7
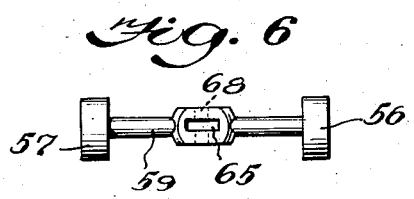
Fig. 6
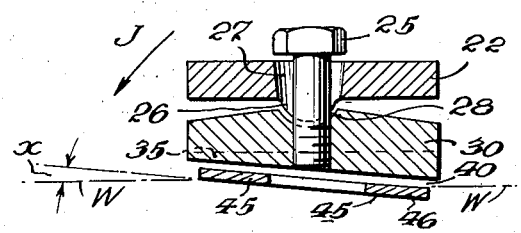
Fig. 8
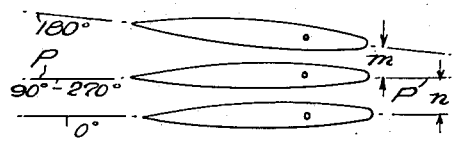
Fig. 9
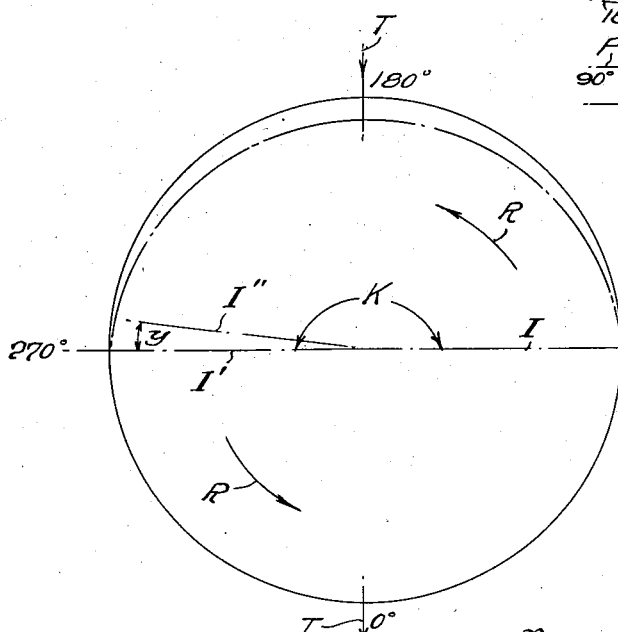
Fig. 10
Inventor
Russell R. Hays
Attorney Patented Jan. 24, 1950

2,495,523

UNITED STATES PATENT OFFICE 2,495,523

SUSTAINING ROTOR FOR AIRCRAFT

Russell R. Hays, Lawrence, Kans.

Application January 20, 1945, Serial No. 573,661

2 Claims. (Cl. 170—160.13)

This invention relates to sustaining rotors for aircraft and more particularly to means for smoothing the operation and control of such rotors in conjunction with causing the rotor blades to feather asymmetrically in such a manner as to produce the equivalent of an increase of the rotor's aspect ratio.

Means for asymmetrically feathering rotor blades are discussed at some length in applicant's prior Patents Nos. 2,086,802 and 2,086,803. In the wind-tunnel testing of small scale rotors to determine which of the proposed means was most efficient, it became necessary to vary the feathering of the rotor blades asymmetrically and by varying degrees through 45° intervals in azimuth. This testing turned out to be much more involved than had originally been anticipated, and although an increase of more than 10 percent in the maximum L/Ds of the rotors was finally obtained, it was associated was a disconcerting amount of hub hammering, with the result that damping means had to be incorporated in the hub structure to smooth the transition from ordinary feathering to asymmetrical feathering before satisfactory tests could be run.

In the study of the results of these tests, particularly when applied to rocking or flapping blade systems, it soon became evident that although the requirement of minimum feathering at forward phases of rotation and maximum feathering during retreating phases of rotation was being met, a more pertinent feature was the relationship between feathering at forward phases and trailing phases of rotation. Consequently a series of tests was run in which the pitch of the blades was simultaneously as well as differentially varied at forward and trailing phases of rotation. Of these tests those in which the pitch of rocking blades was decreased only at forward phases of rotation gave the highest maximum L/Ds. Upon analysis this led to the conclusion that the overall effect of this type of feathering of the rotor was the equivalent of increasing its aspect ratio, since by so doing the pattern of the induced flow through the rotor became somewhat oval in cross-section due to decreased pitch at the leading edge of the rotor disc when not associated with increased pitch angles at trailing phases of rotation.

The application of this finding to the mechanics of the rotor hub when taken with the normal rocking action of a rotor during translation laid emphasis on the fact that the reciprocating motion required to induce such asymmetrical feathering was a periodic motion the frequency, period, and amplitude of which was substantially half that of the harmonic movement of the rotor derived from its rotation. Or broadly the normal rocking of a hinged rotor during translation could be considered as the natural vibration of an elastic system induced by airflow differentials, and the means of decreasing the blade pitch at forward phases of rotation only as a forced vibration acting to damp the blade's upward oscillation.

That such a forced vibration could be instigated by means shown in the patents previously mentioned had been demonstrated, but the mechanisms developed in so doing had proved to be cumbersome and the numerous linkages involved subject to considerable wear, not because of the magnitude of the forces required to induce asymmetrical feathering, but because of the much larger forces imposed upon them by reason of the natural vibration of the rotor as a whole. For practical application, the problem thus became one of inducing such asymmetrical feathering to rotor blades more or less independently of the members by which the blades were mounted on the rotor hub and preferably upon blades mounted resiliently with respect to the supporting structure such as those illustrated in my copending application Serial No. 494,705, filed July 14, 1943, now Patent 2,369,048 dated February 6, 1945, for Helicopters. In developing such a rotor hub structure it became necessary to consider also the effect of cyclic control upon such an automatic blade feathering means. Since the cyclic controls for helicopters now in use tend to transmit the rotor vibration into the controls, and since this must inevitably influence the efficiency of the asymmetrical feathering means were the control utilized to vary the position of its operation in azimuth, it became desirable to develop a simple cyclic control to reduce the transmission of rotor roughness into the supporting structure and the control itself.

In achieving these ends, novel means for mounting the individual blades are incorporated in the hub structure and the respective parts so arranged as to provide automatic asymmetrical feathering in response to rocking of the rotor. Accordingly, the objects of this invention may be stated as:

(1) Provision of an automatic asymmetrical feathering means which gives the equivalent of an aspect ratio change in the rotor's operation.

(2) Provision of a cyclic control the operation of which is in part asymmetrical and independent of the automatic asymmetrical feathering of the blades.

(3) Provision of a rotor blade mounting which utilizes the centrifugal force effective upon the blades to provide a constant torsional moment about the blades, span axes so that the control means are under constant load.

(4) Provision of a spring steel mounting between opposite blades to permit the ready transmission of vibration arising in one blade through the rotor hub for damping by the opposite blade.

(5) Provision of a simplified cyclic control in which rotor vibration is passed directly into the rotor supporting structure instead of into the control lever.

(6) Provision of a resilient member and weights incorporated in the cyclic control swash plate to damp residual vibration out of the control lever.

Ancillary objectives, such as the elimination of hinges in the blade mountings and linkages in the control system, and simplification of the control train by the use of cams and push rods, will become apparent from the following description taken in conjunction with the accompanying drawings in which:

Fig. 1 is a view in side elevation of a rotor mounted according to the invention.

Fig. 2 is a plan view of the rotor mounting illustrated in Fig. 1.

Fig. 3 is a detail of the centrifugal suspension mounting for the rotor blades.

Fig. 4 is a plan view of the twin or paired steel springs on which the blades are suspended.

Fig. 5 is a section taken along the line 5—5 of Fig. 1 showing the swash plate universal used for varying the cyclic feathering cams.

Fig. 6 is a side elevational view of the control cams seen in Fig. 5 and showing the means for mounting the spring steel member of the swash plate assembly.

Fig. 7 is an enlarged diagrammatic end view of the control cams and push rods seen in Fig. 5 and showing the asymmetrical feature of their operation.

Fig. 8 is a cross-sectional view taken along line 8—8 of Fig. 1 and showing the means used to maintain a constant load on the control system by reason of the centrifugal suspension means.

Fig. 9 is a diagrammatic sketch of a blade section taken along line 9—9 of Fig. 2 and showing the relative decrease in pitch of the blade during forward phases of rotation, and Fig. 10 is a diagrammatic view of a rotor disc showing location of the automatic asymmetrical feathering and the asymmetrical operation of the cyclic control with respect to the rotor disc.

Referring to the drawings, a vertically disposed drive shaft 10, Fig. 1, mounted in suitable bearings and turned in a conventional fashion, has an enlarged hollow section 12 in which a swash plate control assembly 14 is mounted, the section 12 extending upwardly to form a head bracket 16 having hangers 18 with aligned holes carrying the hub pin 19 on which a hub bearing 20 is mounted for limited rocking movement in a plane containing the axis A—A of the drive shaft 10. Symmetrically disposed and swept forward with respect to its direction of rotation, the hub bearing 20 carries the transverse spring steel blade supports 22 on which are loosely mounted the spring steel blade butts 30, formed with offset pitch varying arms 31, of the rotor blades 38 and 39 by means of support bolts 24 and 25 which are fixed to the blade butts 30 and are carried in oversized holes 27 of the blade supports 22, whereby the blades are mounted for limited radial and turning movement relative to the blade supports. As seen in Fig. 8, a grooved longitudinal center section 28 of blade butts 30 is provided to receive a corresponding ridge 26 on the under face of blade supports 22, thereby to loosely maintain radial alignment of the blades with the hub structure and to permit limited movement of the blade about its longitudinal axis.

The direct centrifugal loads on the blade are taken by paired steel strip springs 45 and 46 (Fig. 4) fixed intermediate their ends to the flat face 42 of a projection 41 provided on the under side of the hub bearing 20 by screws 43 and to the flat face 40 of a projection 35 provided on the under side of the blade butts 30 and adjacent the blades 38 and 39 by screws 36, both projections being sufficiently deep so as to maintain strip springs 45 and 46 clear of the blade butts and remaining hub structure as shown in Fig. 3. It will be evident, therefore, that when at rest or when overloads in a plane transverse to their plane of rotation are imposed upon the blades 38 and 39, these loads will be taken by the resilient spring steel structure of the loosely interconnected blade supports 22 and the blade butts 30. During normal operation, however, the blades are in effect radially suspended upon the paired springs 45 and 46, Figs. 3 and 4, which because of their spacing in the blades' plane of rotation act to damp any torsion moments about the span axis of the blades, since such moments tend to twist these members and thus shorten the blade, said shortening being resisted by the centrifugal forces effective at the blades' center of percussion.

While it is assumed that the center of percussion of the blades is substantially coincident with their center of pressure, center of pressure travel might at times induce flutter were no torsional moment initially imparted to the blade by the suspension means, it being evident that when strip springs 45 and 46 are closely spaced and lie wholly within the rotor's plane of rotation no torsional moment exists. Accordingly the strip springs are initially twisted by canting the faces 40 of the blade butt projections 35 with respect to the face 42 of the hub bearing projection 41, as indicated by line W—W (Fig. 8) which makes an angle X with the blade butt projection face as shown. Although the direction of action of this initial torsional force may be made to act in either direction and by varying degrees through variously canting the plates to which it is attached, in this instance it is utilized to provide a constant centrifugal couple J tending to increase the attack angle of the blade.

The centrifugal couple J consequently acts to maintain the faces 32 of pitch varying arms 31 of the blade butts 30 in intimate contact with the upper faces 49 of pushrods 52 and 53, Figs. 1 and 7, which are mounted for vertical travel in projections 54 and 55 on the sides of the head bracket 16. Since pushrods 52 and 53 are in effect fixed to the head bracket 16 when the cyclic control is not in operation due to movement of their lower ends being restrained by cams 56 and 57 carried by the shaft 59 journaled in the enlarged section 12 of the drive shaft, it follows that the automatic functioning of the rotor to produce asymmetrical feathering occurs independently of movement of the pushrods, and that movement of the latter acts only to vary the position of this automatic asymmetrical feathering in azimuth in producing control moments on the rotor as a whole.

The mechanism by which asymmetrical feathering is obtained is broadly similar to that incorporated in my prior Patent No. 2,045,355 for a Pitch differential means for lifting propellers, in that rocking action of a two-bladed rotor acts to alternately shift the effective rocking axis of the blade from one to another of multiple axes radially disposed in the hub of the rotor. In this case, these are in effect the axes B—B and D—D, Figs. 2 and 4, the latter making a 90° angle with the span axes C—C of the blades and consequently inducing no pitch variation of the blades during rocking movement about it; whereas the axis B—B makes an acute angle with the span axis C—C of the blade forwardly to its direction of rotation and consequently rocking of the blade about it produces a decrease in the blade's pitch as the blade moves upward from its mean plane of rotation P—P, and an increase in its pitch as it moves downward with respect to plane P—P.

Actually, the main rocking axis B—B determines the rocking path described by the blades at all times thereby maintaining the static balance of the rotor, and by mounting the blades on the hub for turning about their span axis C—C it now becomes possible to vary the rate of this turning asymmetrically by the use of mechanisms lying outside the blade mounting proper. Since the pitch varying arm 31 of the blade butt 30 is restrained from turning in response to the torsional couple J by the face 49 of pushrod 52, which latter may be relatively fixed with respect to the head bracket 16 so that the pushrod face 49 functions as a stop opposed to said couple, it follows that rocking of the hub about the hub pin 19 causes a corresponding rocking of the pitch varying arm 31 about the blade axis C—C, the magnitude of which will vary directly as the distance of the point of restraint on pushrod face 49 from the axis D—D, and inversely as the distance of this point of restraint from the blade axis C—C. Consequently, if the point of restraint of the blade butt arm 31 be alternately varied during different phases of the rotor's rocking arc, the feathering of the blade will be varied by a corresponding degree.

In order that such altering of the point of restraint may be done automatically and with the fewest parts possible the face 49 of pushrods 52 and 53 is made parallel to the face 32 of pitch varying arms 31 during static flight conditions, and consequently longitudinal rocking of the face 32 in response to rocking of the rotor as a whole acts to alternately vary the point of restraint from the heel 48 to the toe 50 of the pushrod face 49. Since the effective rocking axes are defined by these points and the point of intersection AC of the blade axis C—C with the rotor axis of rotation A—A, the effective rocking axes D—D and B'—B' are obtained substantially as shown, the blade moving upward from its static plane of rotation P—P about the axis B'—B' which decreases its pitch, and alternates over to axis D—D in moving downward from its static plane of rotation which serves to maintain the pitch constant during this phase of rocking, the latter normally coinciding with trailing phases of rotation of the rotor with respect to its direction of travel. Consequently the faces 32 of pitch varying arms 31 contact like points on pushrod faces 49 during static flight and during lateral phases of rotation when the rotor is in translation, but contact unlike points, namely a heel 48 and a toe 50 of pushrod faces 49 during longitudinal phases of rotation. It will also be obvious that by varying the length of the face 49 of the pushrods or by initially canting its face with respect to the face of the offset blade butt arm 31, the degree and location of asymmetrical feathering imparted to the blade can be easily varied through a wide range.

Due to relative turning of the blade about its span axis C—C during such feathering, the couple induced by twisting of the paired strip springs 45 and 46 will be increased, and this will be alternately passed on to pushrods 52 and 53 to unbalance the laterally and oppositely acting forces S produced on the faces of the cams 56 and 57 respectively by reason of their curvature. Since the major portion of the load imposed on the push rods 52 and 53 is in vertical alignment with the journaled shaft 59 carrying the cams 56 and 57, the difference in the forces S may be considered as a residual torsional load passed from the asymmetrical pitch varying mechanism into the controls, and as such would be passed on into the cyclic control lever were no provision made to damp it. Accordingly the cam shaft 59 is built with an enlarged center section 63 with a transversely disposed slot 65 which carries a leaf spring 67 symmetrically disposed and fixed by pin 68. As seen in Fig. 5, the spring 67 extends out through the vertical slots 61 in hollow shaft section 12 to end in pivots 70 journaled to weighted sections 71 formed integral with inner race 72 of the swash plate control assembly 14, the inner race being mounted by suitable bearings 73 to the outer race 74 to which is fixed a conventional control handle 75 for tilting the swash plate by varying degrees at different positions in azimuth.

In its operation as a cyclic control through tilting of swash plate assembly 14, the direct response is one of rotating the cams 56 and 57 back and forth at a predetermined position in azimuth and through an arc dictated by the degree of tilting imparted to the swash plate 14 by the control handle 75 as is well known in the art. In the transmission of this turning movement of the cams to the pushrods 52 and 53, however, the degree of movement imparted to opposite pushrods varies from equal up and down movement to impart instead a slight degree of asymmetrical variation to this movement, the purpose of which is to compensate for lag in the transmission of a control moment to the rotor.

In a series of tests conducted with an ordinary two-bladed rocking rotor to determine its sensitivity to a tilting control, one of the tilting arms was hinged with respect to the other so that its position in azimuth could be varied. This is illustrated by arm I' of Fig. 10 which was moved plus and minus from a positon in alignment with the arm I which initiated upward tilting of the rotor. In these tests it was found that when the angle K was increased from 180° the roughness of the control increased, but when it was slightly decreased the operation of the control became smoother. Since movement of the arm I' to the position I" is not feasible in the present invention, the equivalent action is obtained by lowering the downward moving cam at a slightly more rapid rate than the tilt initiating cam is raised. The use of relatively small control cams 56 and 57 supplies such a variation through the geometry of their curvature as illustrated diagrammatically in Fig. 7, where with turning in the direction V of the rigidly interconnected cams on shaft 59, the effect is one of turning the cams through equal arcs F and H, which are opposite in sign with respect to the opposite push rods, with the result that the downward moving cam has a vertical displacement of F' which is greater than the upward displacement H' of the opposite cam. Movement of the control in the reverse direction produces a similar asymmetry which is opposite in sign.

Since the contact faces of the offset blade butt arms 31 and of the push rods 52 and 53 are in substantial parallelism with the axis about which twisting of the blade occurs, it follows that differential movement of the pushrods by means of the control arm 75 will act to vary the position of the automatic operation of the asymmetrical feathering of the rotor induced by its rocking action resultant to translation, as well as to vary it slightly in degree.

As many changes could be made in carrying out the above construction without departing from the scope of the invention, it is intended that all matter contained in the above description or shown in the accompanying drawings shall be interpreted as illustrative and not in a limiting sense.

I claim:

1. In a cyclic pitch varying mechanism for the blades of a lifting propeller, a drive shaft, a hub mounted on said shaft, a transverse shaft journaled in said hub, a bearing mounted upon said transverse shaft, torsional means mounting propeller blades on said bearing for movement about their span axes, pitch control arms mounted on the butt ends of said blades, and stops on said hub engageable by the extending ends of said pitch control arms, each stop having multiple contact points, the arms engaging like contact points when the blades are rotating in their static plane of rotation, and engaging unlike contact points when the blades are not rotating in their static plane of rotation whereby said stops upon engagement with said pitch control arms comprise multiple rocking axes about which said blades alternately rock in response to tilting of said bearing about said transverse shaft, said multiple rocking axes having such angularity with respect to the span axes of said blades that movement of said blades upward from their static plane of rotation causes them to decrease their pitch, whereas movement downward from this plane does not change their pitch.

2. In a rotating blade system, a hub, a pitch control member carried by the hub, means for articulatively mounting a blade on said hub for limited radial and turning movement thereto including a torsionally yieldable tension member secured at one end to said hub and at the other end to the inner end of said blade, a heavier transversely yieldable spring member secured at one end to said hub and overlapping and pivotally carrying the inner end of said blade, and a pitch control arm secured to the inner end of said blade and extending to and contacting said pitch control member carried by said hub, said pitch control member torsionally stressing said tension member to oppose the centrifugal loads effective upon said blade during normal operation and said over-lapping heavier spring members absorbing shock loads transmitted by said blades to said hub transversely to said torsionally yieldable tension member.

RUSSELL R. HAYS.

REFERENCES CITED

The following references are of record in the file of this patent:

UNITED STATES PATENTS

| Number | Name | Date |
|---|---|---|
| 1,682,893 | Cierva | Sept. 4, 1928 |
| 1,979,616 | Haidle et al. | Nov. 6, 1934 |
| 2,030,578 | Flettner | Feb. 11, 1936 |
| 2,045,355 | Hays | June 23, 1936 |
| 2,055,928 | Hays | Sept. 29, 1936 |
| 2,086,802 | Hays | July 13, 1937 |
| 2,086,803 | Hays | July 13, 1937 |
| 2,215,609 | Gilbert | Sept. 24, 1940 |
| 2,221,613 | De Lavaud | Nov. 12, 1940 |
| 2,256,635 | Young | Sept. 23, 1941 |
| 2,369,049 | Hays | Feb. 6, 1945 |
| 2,369,048 | Hays | Feb. 6, 1945 |
| 2,384,516 | Young | Sept. 11, 1945 |
| 2,432,677 | Platt | Dec. 16, 1947 |
| 2,444,070 | Stanley | June 29, 1948 |

FOREIGN PATENTS

| Number | Country | Date |
|---|---|---|
| 449,664 | Great Britain | July 1, 1936 |
| 692,503 | France | Aug. 4, 1930 |